United States Patent Office 3,609,801
Patented Oct. 5, 1971

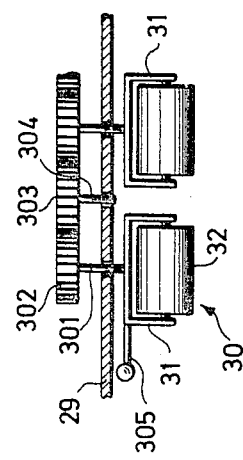
Fig. 5
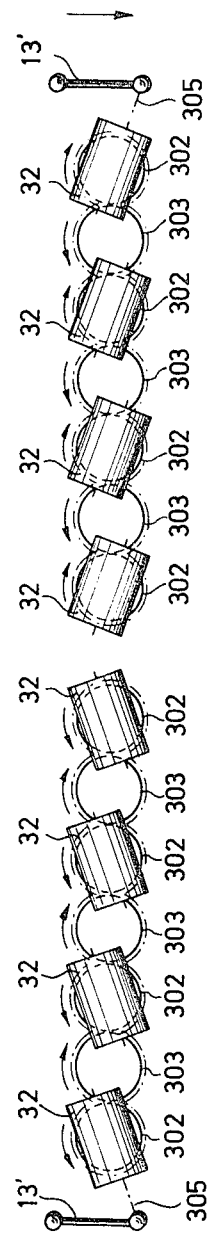
Fig. 6
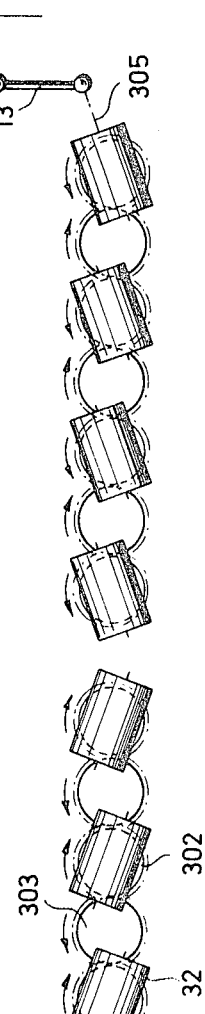
Fig. 7
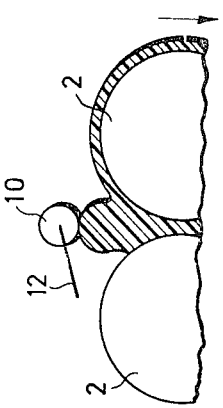
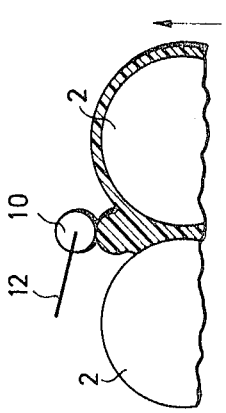

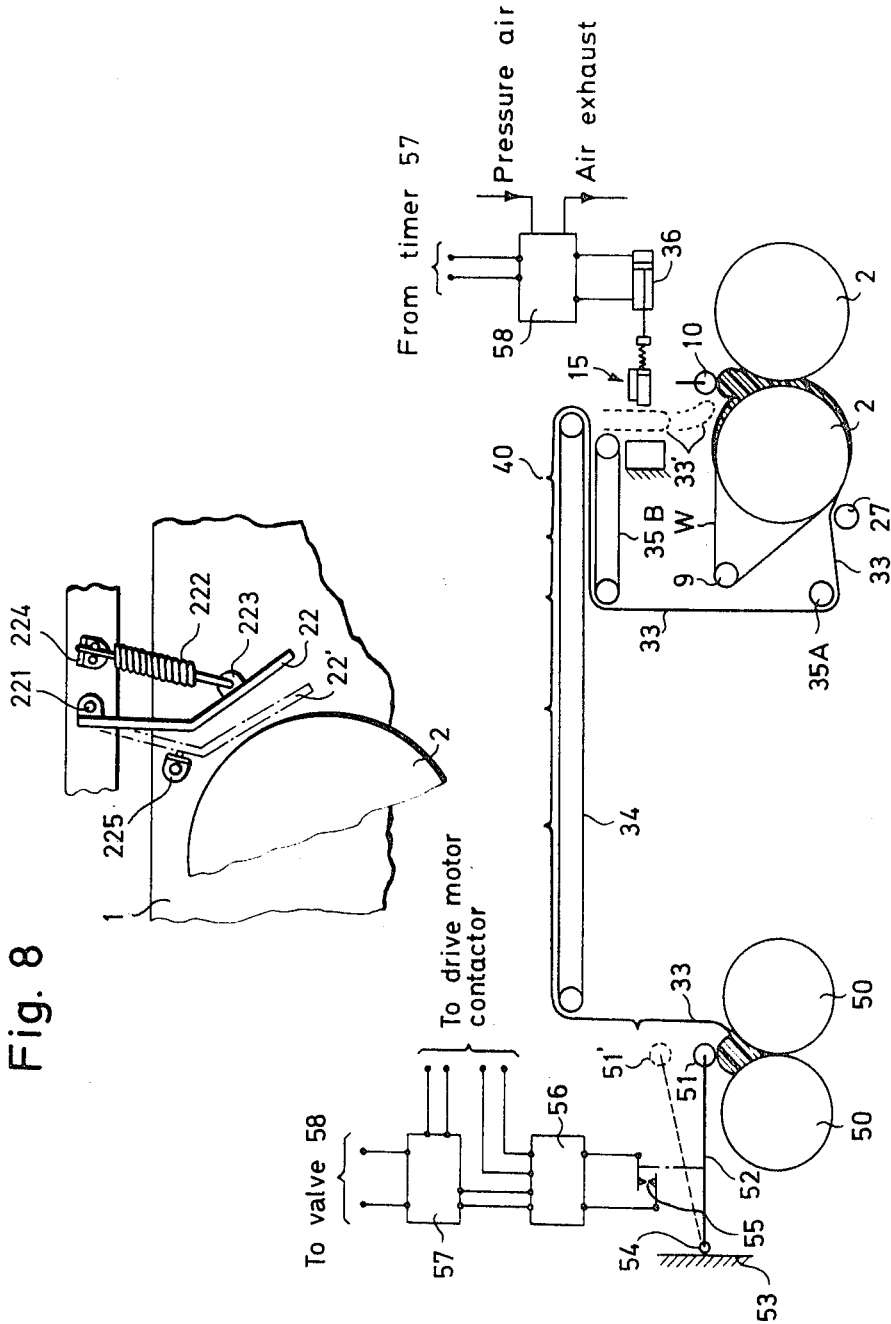

3,609,801
ATTACHMENT TO A PREHEATING MIXING MILL FOR RUBBER
Runo Henry Skarman, 1 Ulvogatan, 266 00 Raa, Sweden, and Stig Gustaf Hellmer Nilsson, 93 Birkagatan, 252 60 Halsingborg, Sweden
Continuation-in-part of application Ser. No. 656,896, July 28, 1967. This application Dec. 2, 1969, Ser. No. 881,387
Claims priority, application Sweden, Aug. 2, 1966, 10,449/66
Int. Cl. B29h 1/00; B29c 15/00; B29d 7/14
U.S. Cl. 18—2 C            5 Claims

ABSTRACT OF THE DISCLOSURE

A device for attachment to a rubber mill is provided which includes partition means at the roll engagement adapted to divide the roll nip into two outer zones for receiving the rubber to be milled and a middle preheating zone from which a strip of milled rubber is cut out for conveyance to the next processing station; adjustable roller means parallel to but spaced from the roll engagement adapted to deflect the remaining cut apart webs towards the middle zone of the roll nip for preheating; and control means comprising a feeling means in said middle zone for determining the amount of rubber material therein, and linkage means connected to said feeling means which transmit to said roller means the amount of adjustment thereof needed to deflect an appropriate amount of said cut apart webs towards said middle zone for processing at the next station. The attachment may also include a cutting and jointing device which compensates for accumulation of milled rubber strip material during stoppages and delays at said next processing station.

CROSS-REFERENCE TO RELATED APPLICATION

This application pertains to an attachment to a preheating mixing mill for rubber and is a continuation-in-part application of U.S. patent application Ser. No. 656,896 filed July 28, 1967, now abandoned.

BACKGROUND OF THE INVENTION

In rubber product manufacturing it is often desirable to roll the rubber material from the mixing, breaking-up or preheating machines into sheets of different thickness, out of which slabs then can be cut for further preparation. This sheeting which is performed by means of calenders is preceded by a mixing mill process wherein the mixing mills mix and at the same time preheat the rubber material.

The usual way of operating such mixing mills is to sheet the rubber and wind it into rolls, often called "chrysalides," which are individually handfed to the calender by the operator. It is obvious that great skill is required on the part of the mixing mill operator in maintaining equal sheeting and preheating conditions for each roll.

SUMMARY OF THE INVENTION

The primary object of the present invention is to eliminate the inherent deficiencies of the manually operated, present day preheating mixing mills, and still produce a more regular and uniform rubber sheet in which all parts of it have been subjected to the same degree of preheating in spite of the fact that no operator is involved. Furthermore, it is an object of this invention to provide means for controlling the material sheeted out by the mill so that the amount discharged always will correspond to the amount required at the next processing station which may be, for example, another preheating mixing mill, a calender, or a cutting machine.

The attachment according to this invention, by which the objects mentioned above are achieved, is adaptable to preheating mixing mills comprising one pair of rolls arranged to receive a charge of rubber to be preheated by processing and sheeting it into a web. The mixing mill preferably includes means for thickness and width adjustment of the rubber web strips cut therefrom.

The main features of the attachment are (1) partition means, e.g. shields at the roll nip, axially dividing this nip into three zones, the outer two of which being charging zones for broken up rubber material, and the middle zone being a preheating and discharging zone for a sheeted rubber strip cut away from the web, and (2) a roller arrangement which is spaced from the two rolls for guiding the web parts—separated from each other as a consequence of the strip being cut away from the web—and for returning them to the rolls. The roller arrangement is controlled by a feeling device in the middle zone of the roll nip, operating in response to the amount of rubber present and thereby adjusting said roller arrangement to supply more or less of the two web parts to the middle zone.

BRIEF DESCRIPTION OF THE DRAWINGS

For the further elucidation of the invention a preheating mixing mill including the attachment of the invention is described and exemplified with reference to the accompanying drawings, wherein
FIG. 5 is a fragmentary plan view of a roller arrangement and interconnecting means of the rollers thereof;
FIGS. 6 and 7 are diagrammatic views of the mixing mill rolls and the feeling member associated therewith seen from one end of the rolls, and the roller arrangement seen from the front thereof, illustrating different operating positions of the rollers;
FIG. 8 is a side view of a feeling sheet associated with one of the mixing mill rolls;
and
FIG. 9 is a diagrammatic view illustrating the operative interconnections of the mixing mill and a calender supplied therefrom.

DESCRIPTION OF PREFERRED EMBODIMENTS

Figure 1:
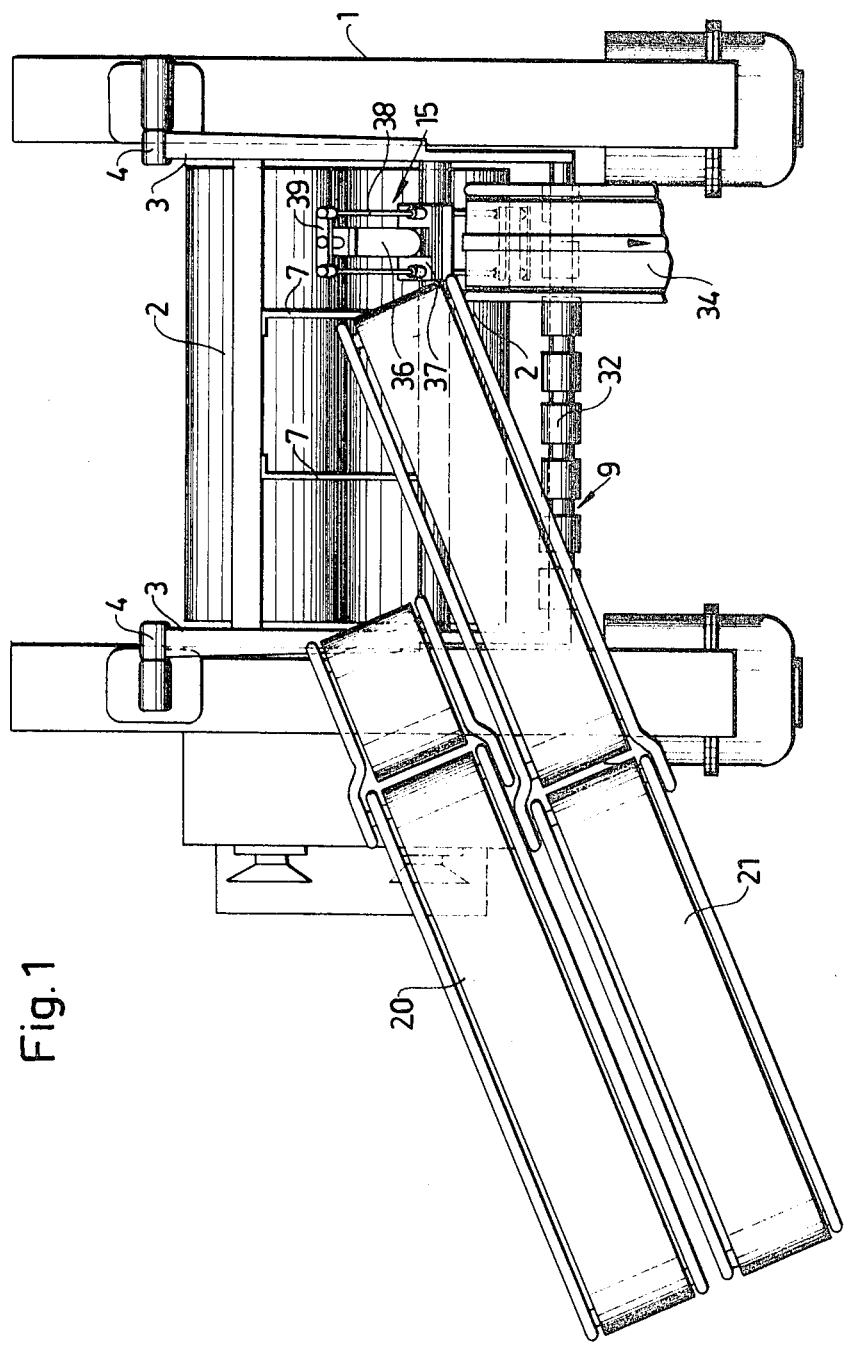
FIG. 1 is a horizontal view of the mixing mill.
Figure 2:
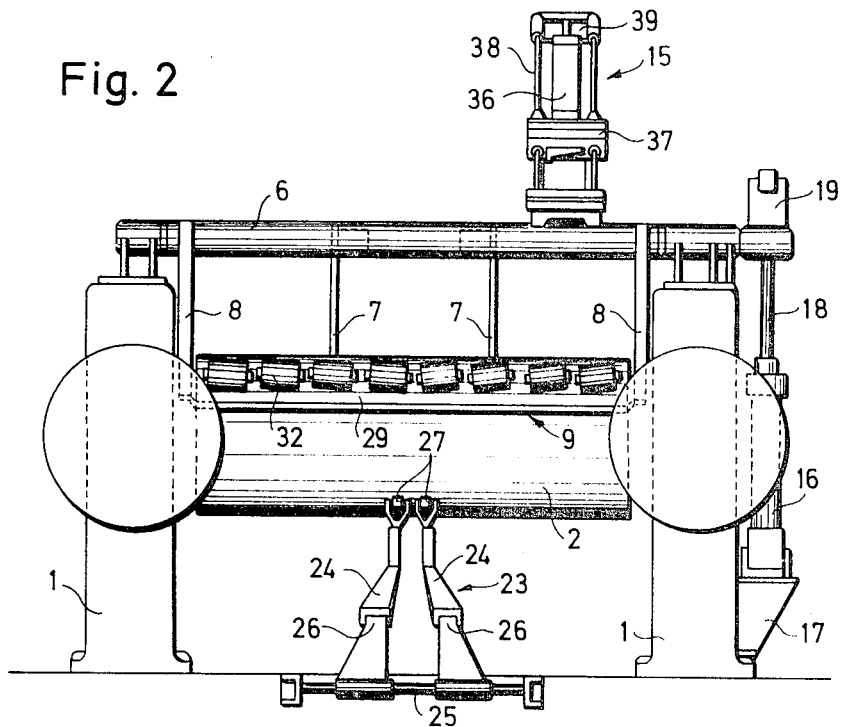
FIG. 2 is a vertical front view of the mixing mill.

The mixing mill shown in the drawings comprises a frame 1, in which two horizontal rolls 2 are rotatably mounted one before the other and driven by appropriate gears. One roll is movable forwards and backwards for roll nip adjustment, thus providing for the adjustment of the roll nip to the amount of rubber material to be sheeted to meet the demand at the next processing station.

Above rolls 2 a vertically pivoted framework is positioned consisting of two parallel side arms 3, the rear ends of which are pivoted at point 4 of frame 1, and two crossbeams 5 and 6 connecting the two arms 3. Crossbeams 5 and 6 carry two shields 7 arranged perpendicularly to the longitudinal direction of the rolls. A small space is provided between the lower edge of each shield 7 and the surface of rolls 2 for a purpose to be described later. The shields are suspended essentially between the rolls towards the roll nip and axially spaced to divide the infeed side of the two rolls into three zones, the outer two of which being charging zones, the middle one being the actual preheating zone.

The front ends 8 of arms 3 are downwardly directed to carry a roller arrangement 9. Rubber material sheeted into a continuous web by means of the two milling rolls 2 travels around the roller arrangement 9 and is fed back to the roll nip; a more detailed description thereof will be given below.

Framework 3-6 also comprises a roller 10 acting as a device to feel the amount of rubber materal lying above the middle zone roll nip between the rolls. Roller 10 is rotatably mounted in a fork member 11 supported by a linkage 12, which comprises an arm 121 pivotally connected for movement around a horizontal axis at 122 in two arms 123 rigidly connected with and projecting from crossbeam 5, fork member 11 being rigidly connected with arm 121 by a stem 124. Linkage 12 further comprises a link 125 connected with arm 121 and an arm 126 in joints 127 said arm 126 projecting from a shaft 128, which is disposed in crossbeam 6 and is rotatably mounted in arms 3 at its ends. Roller 10 is adapted to bear on the material in the middle zone of the roll nip and thereby will be raised and lowered in dependence of the amount of material in said zone. Linkage 12 transmits movements of the roller caused by increases and decreases in rubber stock at the nip to shaft 128 which has near each end thereof an arm 13 connected by a link 13' to the roller arrangement 9 to adjust such roller arrangement in a manner to be described, in order to decrease or increase that part of the sheeted rubber material which is to be returned to the middle zone.

Figure 4:
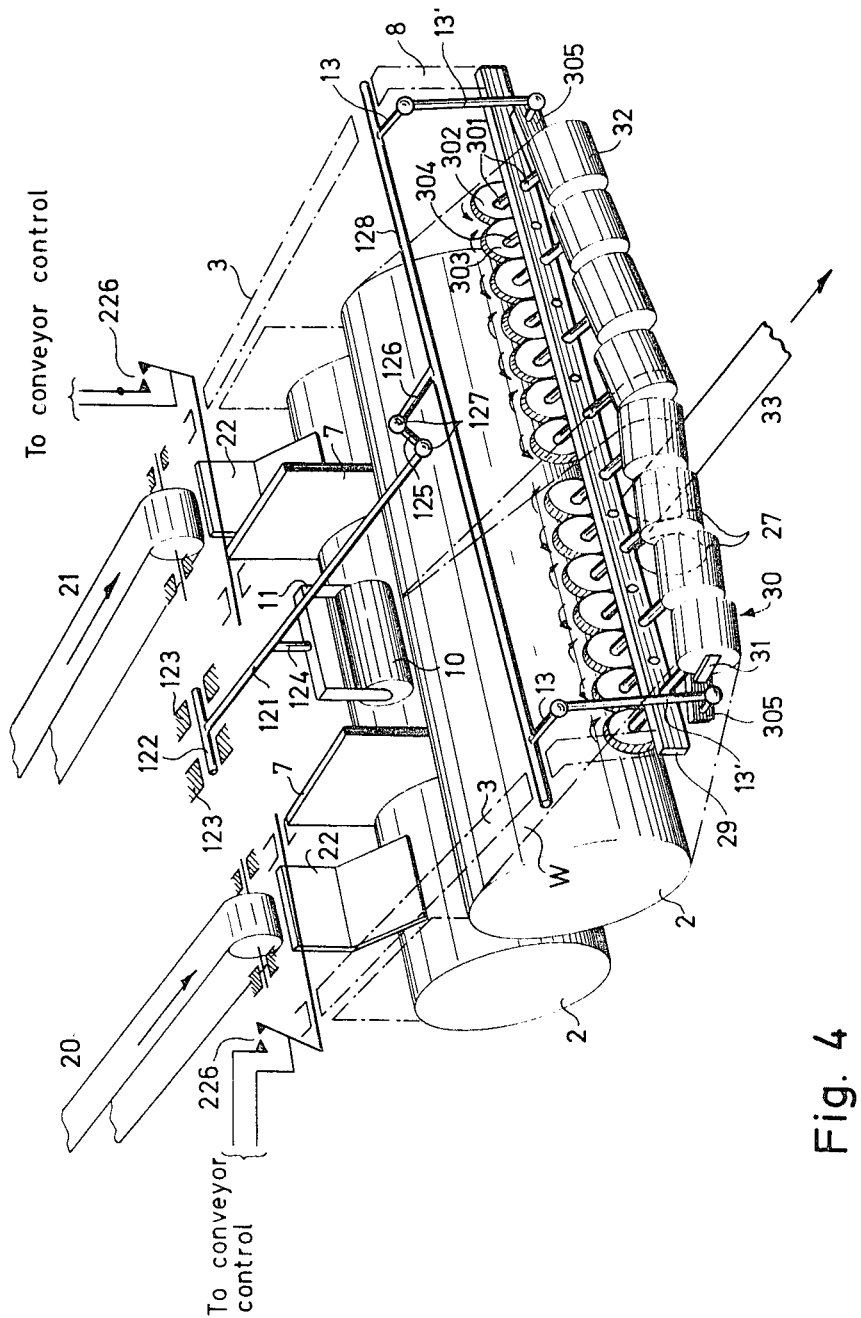
FIG. 4 is a perspective front view of part of the mill seen from the left.

The roller arrangement 9 comprises a cross beam 29, suitably a box section, positioned between the ends of the parts 8, and eight bearing jackets 30 arranged in a row and projecting from the crossbeam 29. Each of the bearing jackets 30 comprises a fork-like member 31 pivoted by a shaft pivot 301. The several shaft pivots are interconnected in two separate banks by means of gear wheels arranged inside crossbeam 29. Referring to FIGS. 4 and 5 it will be seen that each shaft pivot 301 is provided with a gear wheel 302; the four fork members 31 on one half of the roller arrangement 9 forming one bank of rollers are interconnected by reversing gear wheels 303 rotatably mounted on stubs 304 projecting from beam 29, and the remaining four fork members on the other half are interconnected in the same manner by gear wheels 303 rotatably mounted on stubs 304. Thus, it will be seen that if one roller in one of the banks of rollers is turned around the axis of the shaft pivot associated therewith the remaining rollers in the same bank will be positively turned in the same direction and in the same amount since all gear wheels are of the same diameters. Linkage 12 is connected by arms 13 and links 13' to an arm 305 projecting from the outmost fork member 31 in the left hand roller bank and the right hand roller bank, respectively, to operate the two outmost fork members for a turning movement around the pivot shaft thereof. Thus, it will be seen that the two roller banks are turned in dependence of the position of roller 10 in opposite directions. Summarizing the rollers 32 can be set at several angles of inclination by means of a corresponding movement of the linkage, the four left hand rollers in one direction and the four right hand rollers in the opposite direction. The momentary tilting position of the rollers 32 is controlled by the feeling device roller 10 via linkage 12.

To the top of the front crossbeam 6 is attached a holder 14 for a cutting-off and jointing unit 15, whose function will be described below.

By swinging up framework 3-6 all devices and units described above will be idled, making it possible to operate the mixing mill manually when desired. The framework can be swung up hydraulically by means of a trunnion-mounted hydraulic cylinder 16 supported by a bracket 17 at the rear part of the frame, the cylinder piston rod 18 being hinged to crank rod 19 which is firmly attached to the framework pivot shaft 4.

The two outer zones of the infeed side of the two rolls 2 are as mentioned above the charging zones for broken up rubber material, which is to be sheeted and simultaneously preheated, the heat being generated during the mixing process. The rubber material can be charged in different ways, but FIG. 1 shows two belt conveyors 20 and 21 reaching over the mixing mill, the two outfeed ends of the conveyors being situated over one charging zone respectively. In each charging zone there is provided a sensing means comprising a sheet member 22 as disclosed in FIG. 4. Referring to said figure and also to FIG. 8 it will be seen that each sheet member 22 comprises two angled portions and is arranged in a hanging position adjacent the rear roll 2. Sheet member 22 is connected to a shaft 221 which is rotatably mounted in arms 3 and extends substantially horizontally and is parallel to the rotational axis of rollers 2. A tension spring 222 is connected at one end with sheet member 22 at 223 and is connected at the other end with a bracket 224 mounted on one of the arms 3. This spring holds the sheet member in a forward position shown in full lines in FIG. 8. However, sheet member 22 may be pushed against the force provided by spring 222 to a rearward position shown by dotted lines 22' in FIG. 8 and defined by an abutment 225 mounted on framework 1. When there is no rubber material in the zone in which the respective sheet member is provided such sheet member will be held in its forward position by spring 222. When there is a sufficient amount of rubber material in the said zone, the sheet member will be pressed back against the abutment 225. The sheet member is connected electrically by a switch 226 to control means for the two belt conveyors 20 and 21 to start and stop these conveyors individually as soon as the amount of rubber material in the zone in question is reduced under a predetermined amount and a sufficient amount of material is supplied, respectively.

Figure 3:
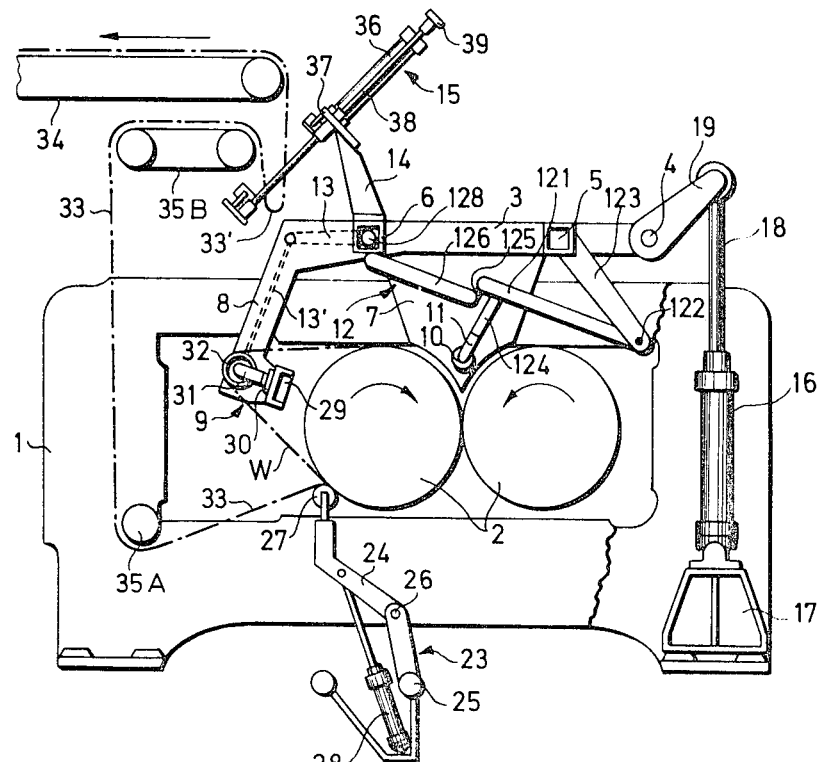
FIG. 3 is a vertical sectional view and partly a side view of FIG. 1 seen from the right.

Below the front roll 2 a cutting device 23 is arranged for cutting-off a thin strip 33 of the web W of the sheeted material before such web is returned to the roll nip over roller arrangement 9. The cutting device 23 consists of the two arms 24 which are pivoted and movably arranged side by side on a horizontally transverse shaft 25, each arm consisting of two parts connected in the middle by means of a hinge 26, and also two cut-off discs 27, each rotatably mounted to the outer end of one of the arms 24. A pneumatic cylinder 28 (FIG. 3) is arranged to operate arms 24 in order to press the cut-off discs 27 against the rubber material web. Consequently, the width of the strip 33 cut out by the cut-off discs 27 will correspond to the distance between the two arms 24. Depending on the amount of material required from the mixing mill this distance can be adjusted by moving the arms on the axle 25 by means of an adjusting device (not shown). To secure a uniform preheating of the material without taking into consideration the amount of material extracted, this adjusting device can be connected to the movable roll 2 in a way which will give a proportional change in width and thickness of the strip.

When roller 10 is raised in consequence of an increased amount of rubber material in the middle zone of the nip of rolls 2, as shown in FIG. 6, the angular position of rollers 32 will be changed so as to direct by way of the tilting of the rollers a smaller amount of web W towards the middle zone of the mixing mill, causing a corresponding rubber material decrease in the zone. On the other hand, when roller 10 is lowered in consequence of a reduced amount of rubber material in the middle zone, as shown in FIG. 7, the angular position of rollers 32 will be changed in the opposite direction to that in FIG. 6 in order to direct a greater amount of web towards the middle zone of the mixing mill, causing a corresponding rubber material increase in the zone. This control of the middle zone material supply will take place continuously without any noticeable changes and the mixing mill will be automatically balanced around a mean adjustment position.

The combination of the charging and preheating zone partitions of the mixing mill and the adoption of the roller device 9 for returning the rubber material web parts left after the cutting out of the strip 33 and also, for directing them more or less towards the preheating zone (the middle zone), has the important function of preventing rubber particles from returning to a point between the rolls previously passed, provided any material discharge is occurring at all. The small space provided between the lower edge of shields 7 and the surface of rolls 2 allows only a marginal part of the cut-apart web 33 to intrude into the middle zone depending on the angle of tilt rollers 32. On the other hand this same small space prevents the newly charged rubber material accumulating at the roll nip in the two outer zones from entering into the middle zone without first becoming properly preheated and mixed by several passes through the mill. It will be seen that it is impossible for the rubber material web to run around in the mill repeatedly thus being subject to a continuous preheating which would finally vulcanize the material. Thus, a more uniform preheating will be obtained in that part of the rubber material web from which strip 33 is taken.

After the milling of rubber materials further processing of the material is usually required. Such processing may include, e.g. treating in a calender. Thus, a processing station further down the line may be equipped with control mechanisms which automatically shut down the operations behind it when such station cannot process the material being supplied to it. In FIG. 9 there is shown diagrammatically in combination with the mixing mill according to the invention a calendar comprising two rolls 50 forming a nip therebetween. Between the preheating mixing mill and the calender which shall receive the strip 33 a belt conveyor 34 is arranged by means of which the strip is supplied to the calender. The strip leaving cutting rollers 27 passes over guide rollers 35A and a supporting and guiding conveyor 35B and is then supplied to the inlet end of conveyor 34 from which it is discharged hanging down from the discharge end thereof to the calender. The calender is provided with a feeling device comprising a roller 51 which is rotatably mounted on an arm 52 which is pivotally connected to the frame of calender, partly disclosed at 53, for pivoting movement around a horizontal axis at 54 which is parallel to the rotational axes of rolls 50. Roller 51 bears under gravity on the material in the roller nip and will be raised and lowered in dependence of the amount of material in said nip. Associated with arm 52 are normally closed contacts 55 which will be opened in dependence of upward movement of roller 51, e.g. when said roller has reached the position 51' shown by dotted lines in FIG. 9. Contacts 55 are connected to a relay 56 controlling the drive motor contactor of conveyor 34 and, as will be described later, also the operation of cutting-off and jointing unit 15. When contacts 55 are closed conveyor 34 is continuously running.

When the amount of rubber material supplied to the calender is commensurate with the capacity of the calender, contacts 55 will remain closed to keep conveyor 34 running. However, when roller 51 is raised to position 51' due to an increased amount of material in the nip between calender rolls 50, contacts 55 will open and conveyor 34 thereby will be stopped.

When conveyor 34 is at a standstill conveyor 35B will continue to supply the strip 33 from the preheating mixing mill and such strip will hang down in a loop 33' which will increase in length with the time of the standstill of conveyor 34. Now, when relay 56 stops conveyor 34 it also starts a timer 57 which is connected both to the driving motor of conveyor 34 and to a pneumatic solenoid valve 58 which controls the cutting-off and jointing unit 15.

Unit 15 comprises a pneumatic cylinder 36 supported by a part 37 attached to the holder 14. Part 37 forms a guide for two slide rods 38, to the lower ends of which are attached a guillotine knife and a swage for shaping trusses and whose upper ends are connected with the piston of the pneumatic cylinder by means of a cross piece 39. On part 37 there are arranged a fixed guillotine knife and a fixed swage for shaping trusses, which correspond to those mentioned above.

When contact 55 has been opened timer 57 will cause delayed energization of valve 58 and, thereby, compressed air for one complete stroke forth and back of cylinder 36 is supplied thereto. During this stroke the knives will cut off the depending loop 33' and the swages will fuse together the strip end depending from the entrance end of conveyor 34 and the strip end depending from the outlet end of conveyor 35B thereby forming a truss 40 on the strip. When the stroke is completed timer 57 energizes the drive motor of conveyor 34 to move the strip thereon a short distance in order to remove the truss thus formed from the range of the cutting-off and jointing unit 15. A new depending loop 33' now will be formed and after an interval determined by timer 57 this loop will be cut off and the operation just described will be repeated. This will continue as long as roller 51 is in the position 51'. The cut off loop will fall down into the nip betwen rolls 2. It will be noted that the interval defined by timer 57 must be short enough to prevent depending loop 33' to be grasped by rolls 2. When the material in the nip between calender rolls 50 has decreased sufficiently to close contacts 55 the continuous strip 33 having more or less trusses thereon will be continuously supplied to the calender.

We claim:

1. An automatically working attachment for rubber mills having a pair of rolls adapted to receive rubber material for preheating of the same by processing and by milling out a web thereof and means for cutting out a strip of desired thickness and width from said web, comprising partition means arranged close to the roll nip and adapted to divide the same in three zones, the outer zones being receiving zones for broken up rubber material and the middle zone being a preheating zone and a discharging zone for said strip being cut out from the web of said milled rubber material in said middle zone, roller means arranged essentially parallel to the axis of said rolls and spaced from the same and adapted to receive the cut apart remaining parts of the web and deflect said parts towards each other and return the same to the mill, feeling means arranged in said middlezone for controlling said roller means dependent on the amount of rubber material in said zone, and means for deflecting the axis of rotation of said roller means relatively to said rolls.

2. An automatically working attachment for rubber mills, specially for a combination of two or more mills, having a pair of rolls adapted to receive rubber material for preheating of the same by processing and by milling out a web thereof and means for cutting out a strip of desired thickness and width from said web, comprising partition means arranged close to the roll nip and adapted to divide the same in three zones, the outer zones being receiving zones for broken up rubber material and the middle zone being a preheating zone and a discharging zone for said strip being cut out from the web of said milled rubber material in said middle zone, roller means arranged essentially parallel to the axis of said rolls and spaced from the same and adapted to receive the cut apart remaining parts of the web and deflect said parts towards each other and return the same to the mill, feeling means arranged in said middlezone for controlling said roller means dependent on the amount of rubber material in said zone, and means for deflecting the axis of rotation of said roller means relatively to said rolls and further means to convey tthe cut out strip to a device for, as the case may be, cutting off said strip and for rejointing the ends thereof and then conveying the same to a further processing station.

3. An automatically working attachment for rubber mills according to claim 1 wherein said means for cutting out said strip to desired width and thickness are adapted to actuate the rolling stand in order to change the nip between the rolls and further through said change of the nip to adjust the means cutting out said strip by changing the distance between two cutting means to proportion said distance in accordance with the change of the nip width.

4. An automatically working attachment for rubber mills according to claim 1 wherein said roller means are selfcentering and comprises a number of fork-like members aligned with each other in front of the front roll and in which members rollers are arranged freely rotatable, said fork-like members being pivotable and the axis of the rollers being adjustable in relation to the axis of the rolls in different angles of inclination, and wherein said fork-like members are so connected with each other and with a linkage system actuated by said feeling means that a given moment of the feeling means is adapted to turn the rollers to the left of the middle part of the rubber mill to a given inclination against the roll axis and to turn the rollers to the right of the middle par to a corresponding inclination in the opposite direction.

5. An automatically working attachment for rubber mills, specially for a combination of two or more mills, having a pair of rolls adapted to receive rubber material for preheating of the same by processing and by milling out a web thereof and means for cutting out a strip of desired thickness and width from said web, comprising partition means arranged close to the roll nip and adapted to divide the same in three zones, the outer zones being receiving zones for broken up rubber material and the middle zone being a preheating zone and a discharging zone for said strip being cut out from the web of said milled rubber material in said middle zone, roller means arranged essentially parallel to the axis of said rolls and spaced from the same and adapted to receive the cut apart remaining parts of the web and deflect said parts towards each other and return the same to the mill, feeling means arranged in said middlezone for controlling said roller means dependent on the amount of rubber material in said zone, and means for deflecting the axis of rotation of said roller means relatively to said rolls and further means to convey the cut out strip to a device for cutting off said strip and for rejointing the ends thereof, a further processing station, means to convey said strip from said cutting and joining mill to said further processing station, and means operatively interconnecting said cutting and joining device and said further processing station to stop the feed to said station if too much material is fed thereto.

References Cited

UNITED STATES PATENTS

| | | | |
|---|---|---|---|
| 2,469,633 | 5/1949 | Conson | 18—2 C |
| 2,534,296 | 12/1950 | Pike et al. | 18—2 C |
| 3,166,790 | 1/1965 | Keyes | 18—19 |
| 3,170,499 | 2/1965 | Deist. | |
| 3,274,308 | 9/1966 | Freeman et al. | |

J. SPENCER OVERHOLSER, Primary Examiner

R. L. SPICER, JR., Assistant Examiner

U.S. Cl. X.R.

18—4R, 5C, 5L, 15R